(12) United States Patent
Tang

(10) Patent No.: US 8,433,324 B2
(45) Date of Patent: Apr. 30, 2013

(54) PORTABLE ELECTRONIC DEVICE AND POSITION TRACKING METHOD OF THE DEVICE

(75) Inventor: Cheng-Wen Tang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 110 days.

(21) Appl. No.: 13/076,427

(22) Filed: Mar. 31, 2011

(65) Prior Publication Data

US 2012/0046041 A1 Feb. 23, 2012

(30) Foreign Application Priority Data

Aug. 23, 2010 (CN) .......................... 2010 1 0260260

(51) Int. Cl.
*H04W 6/00* (2006.01)
(52) U.S. Cl.
USPC .................. 455/440; 455/456.2; 455/456.1; 370/328

(58) Field of Classification Search .................. 455/440, 455/456.1, 456.2; 370/328
See application file for complete search history.

(56) References Cited

U.S. PATENT DOCUMENTS

| | | | | |
|---|---|---|---|---|
| 7,840,227 | B2 * | 11/2010 | Kahlert et al. | 455/456.2 |
| 8,031,657 | B2 * | 10/2011 | Jones et al. | 370/328 |
| 2008/0242305 | A1 * | 10/2008 | Kahlert et al. | 455/440 |
| 2012/0046041 | A1 * | 2/2012 | Tang | 455/456.1 |

\* cited by examiner

*Primary Examiner* — William D Cumming
(74) *Attorney, Agent, or Firm* — Altis Law Group, Inc.

(57) ABSTRACT

A location tracking method using a portable electronic device utilizes communication with a server through access points. The portable electronic device creates a database to restore information of the access points and scans the access points which can communicates and searches the information of the access points scanned from the database. The portable electronic device logs onto the access points and transmits transmitter packages including the access points scanned and scanning time of the access points to the server for tracking locations of the portable electronic device.

20 Claims, 3 Drawing Sheets

PORTABLE ELECTRONIC DEVICE AND POSITION TRACKING METHOD OF THE DEVICE

BACKGROUND

1. Technical Field

Embodiments of the present disclosure relate to communications, and more particularly to wireless communications with location capabilities.

2. Description of Related Art

Wireless communication devices providing a wireless connection to the Internet are experiencing massive popularity. For example, wireless laptop computers and related mobile devices can connect to the Internet through wireless access points in public places. However, a user of a wireless communication device is generally unable to acquire a current position utilizing the wireless connection only. What is needed, therefore, is a position tracking method of the portable electronic device to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
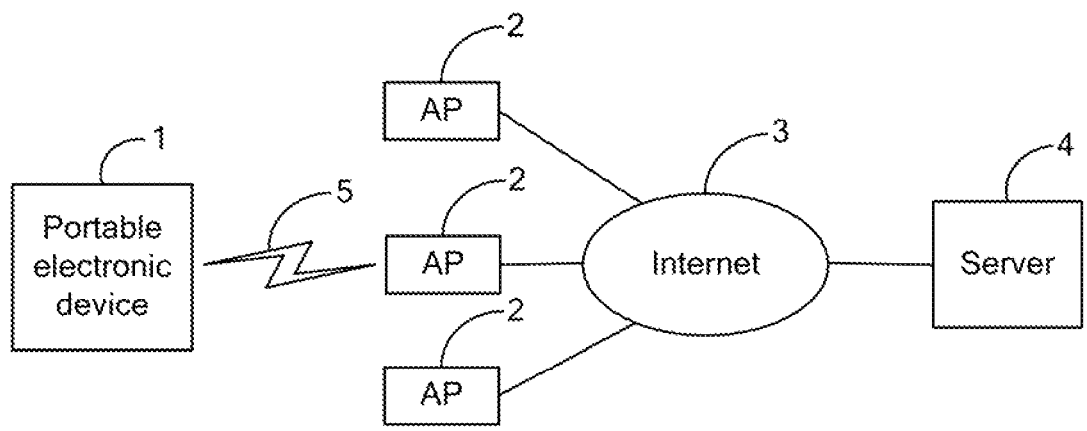
FIG. 1 is a schematic diagram of an exemplary network comprising a portable electronic device communicating with access points.

FIG. 1 is a schematic diagram of an exemplary network comprising a portable electronic device 1 communicating with access points 2. The portable electronic device 1 wirelessly communicates with the access points 2 through a wireless network 5. For example, the wireless network 5 may be WIFI. The access points 2 communicate with a server 4 located in an Internet Service Provider (ISP) through the Internet 3.

The portable electronic device 1 is generally controlled and coordinated by an operating system software, such as UNIX, LINUX, WINDOWS, MAC OS X, an embedded operating system, or any other compatible operating systems. In other embodiments, the portable electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

Figure 2:
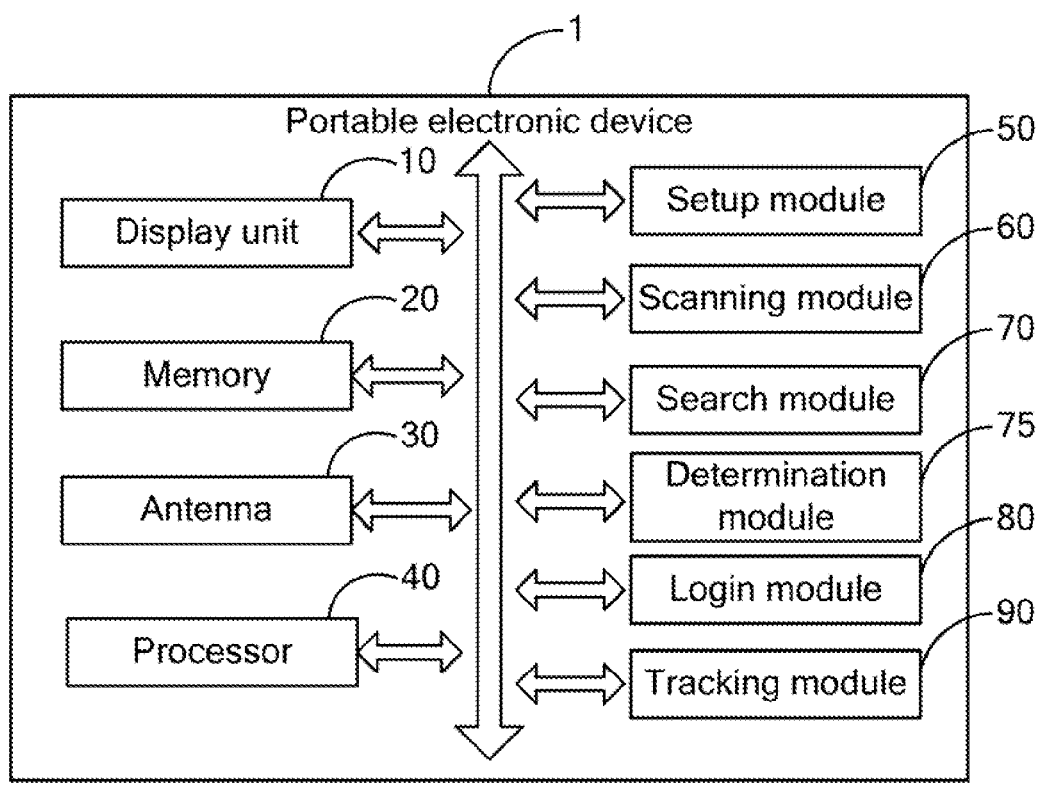
FIG. 2 is a block diagram of one embodiment of a portable electronic device.

FIG. 2 is a block diagram of one embodiment of the portable electronic device 1. Depending on the embodiment, the portable electronic device 1 may be a mobile phone, a personal digital assistant (PDA), a handheld computer, or other device. The portable electronic device 1 includes a display unit 10, a memory 20, an antenna 30, at least one processor 40, and one or more programs including a setup module 50, a scanning module 60, a search module 70, a determination module 75, a login module 80, and a tracking module 90.

The display unit 10 displays information related to location information of the portable electronic device 1 and information of the access points 2. For example, the location information may be a movement path of the portable electronic device 1. The display unit 10 can be a display screen, a resistive touch screen, or a capacitive touch screen.

The antenna 30 is operable to receive and transmit analog signals between the portable electronic device 1 and the access points 2. The analog signals received from the antenna 30 are converted into digital signals via a digital analog converter (DAC).

The memory 20 is electronically connected to the display unit 10, the antenna 30, the at least one processor 40, the setup module 50, the scanning module 60, the search module 70, the determination module 75, the login module 80 and the tracking module 90. The memory 20 is operable to store many kinds of data, such as the location information of the portable electronic device 1 and the information of the access points 2, a customization function code of the portable electronic device 1, programs of an operating system and other applications of the portable electronic device 1. The memory 20 may include a hard disk drive, flash memory, RAM, ROM, cache, or external storage media.

The modules 50-90 may comprise computerized code in the form of one or more programs stored in the memory 20. The computerized code includes instructions that are executed by the at least one processor 40 to provide functions for modules 50-90. The at least one processor 40, as an example, may include a CPU, math coprocessor, shift register, for example.

The setup module 50 is operable to create a database for restoring information of the access points 2 in the memory 20. The access points 2 are located in the wireless network 5. In some embodiments, the information of the access points 2 may be Service Create Identifiers, locations of the access points 2, login names and passwords of the access points 2 for entering into the wireless network 5.

The scanning module 60 is operable to scan the access points 2 which communicate with the portable electronic device 1. In some embodiments, when the portable electronic device 1 is in transit (e.g., moving from one area to another area), the scanning module 60 scans the access points 2 which communicate with the portable electronic device 1. In addition, the scanning module 60 further saves the information of the access points 2 being scanned and the time that access points 2 have been scanned in the memory 20 ("the scanning time").

The search module 70 is operable to search the information of the access points 2 that have been scanned from the database. In some embodiments, the database saves the information of the access points 2. In some embodiments, the information of the access points 2 includes the Service Create Identifiers, the locations of the access points 2, and the login names and passwords of the access points 2 located in the Internet 3.

The determination module 75 is operable to determine whether the scanned access points 2 are saved in the database. In some embodiments, the determination module 75 determines whether the portable electronic device 1 can log onto the access points 2 by the Service Create Identifiers. In some embodiments, the determination module 75 determines whether the portable electronic device 1 can log onto the access points 2 by the login names and passwords of the access points 2.

The login module 80 is operable to log the portable electronic device 1 onto the scanned access points 2 if the scanned access points 2 are saved in the database. In some embodiments, the login module 80 logs the portable electronic device 1 onto the scanned access points 2 by the Service Create Identifiers of the access points 2. In some embodiments, the login module 80 logs the portable electronic device 1 onto the scanned access points 2 by the login names and passwords of the access points 2.

The tracking module 90 is operable to transmit transmitter packages to the server 4 by the antenna 30 for tracking locations of the portable electronic device 1. When receiving the transmitter packages transmitted from the tracking module 90 of the portable electronic device 1, the server 4 can calculate the locations of the portable electronic device 1. In some embodiments, the transmitter packages is electronic data that comprise information of the scanned access points 2 and the scanning time. Accordingly, the server 4 continuously receives the transmitter packages transmitted from the portable electronic device 1 in transit, and the server 4 can calculate the movement path of the portable electronic device 1. For example, the information of the scanned access points 2 may be the locations of the access points 2.

Figure 3:
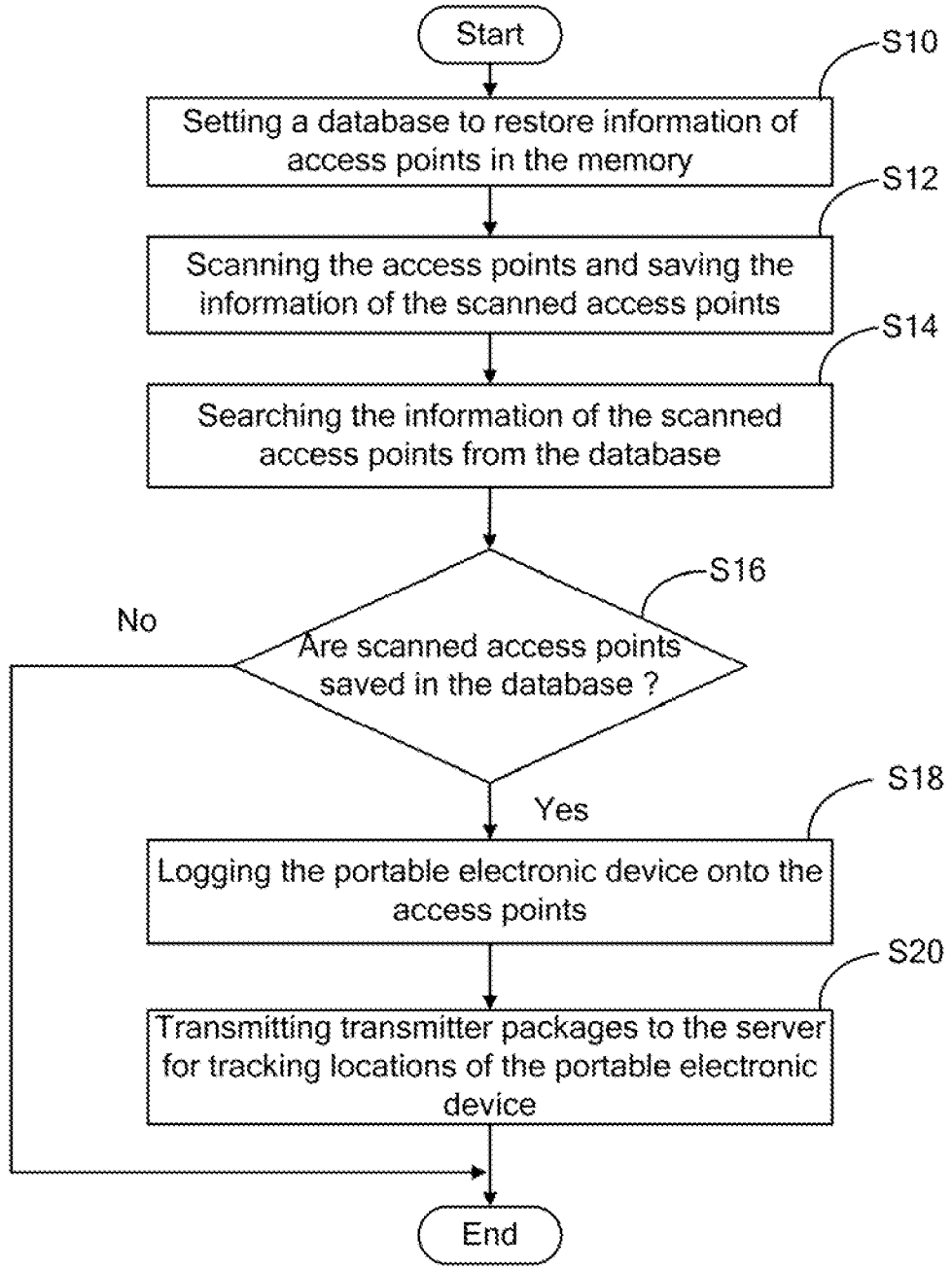
FIG. 3 is a flowchart of one embodiment of a location tracking method using a portable electronic device.

FIG. 3 is a flowchart of one embodiment of a location tracking method using a portable electronic device 1. Depending on the embodiment, additional blocks may be added, others deleted, and the ordering of the blocks may be changed.

In block S10, the setup module 50 creates a database for restoring information of the access points 2 in the memory 20 for the portable electronic device 1.

In block S12, the scanning module 60 scans the access points 2 which can communicate with the portable electronic device 1. In addition, the scanning module 60 saves the information of the scanned access points 2 and scanning time of the scanned access points 2 in the memory 2. For example, the information of the scanned access points 2 may be the locations of the access points 2.

In block S14, the search module 70 searches the information of the scanned access points 2 from the database stored in the memory 20.

In block S16, the determination module 75 determines whether the scanned access points 2 are saved in the database.

In block S18, the login module 80 logs the portable electronic device 1 onto the scanned access points 2 if the scanned access points 2 are saved in the database. In some embodiments, the login module 80 logs the portable electronic device 1 onto the scanned access points 2 by Service Create Identifiers of the access points 2. In some embodiments, the login module 80 logs the portable electronic device 1 onto the scanned access points 2 by login names and passwords.

In block S20, the tracking module 90 transmits transmitter packages to the server 4 by the antenna 30 of the portable electronic device 1. The locations of the portable electronic device 1 can be calculated by the server 4 according to the transmitter packages transmitted from the tracking module 90 of the portable electronic device 1. In some embodiments, the server 4 can calculate a movement path of the portable electronic device 1 by receiving the transmitter packages transmitted from the portable electronic device 1 in transit.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device in communication with a server through access points, comprising:
   an antenna;
   a memory;
   a display unit;
   at least one processor;
   one or more programs that are stored in the memory and are executed by the at least one processor, the one or more programs comprising:
   a setup module operable to create a database used to restore information of the access points in the memory;
   a scanning module operable to scan the access points which can communicate with the portable electronic device and save information of the scanned access points and scanning time of the access points in the memory;
   a search module operable to search the information of the scanned access points from the database;
   a determination module operable to determine whether the scanned access points are saved in the database;
   a login module operable to log the portable electronic device onto the scanned access points if the scanned access points are saved in the database; and
   a tracking module operable to transmit transmitter packages to the server using the antenna to track locations of the portable electronic device.

2. The portable electronic device of claim 1, wherein the information of the scanned access points comprise information of Service Create Identifiers, locations of the access points, and login names and passwords of the access points.

3. The portable electronic device of claim 1, wherein the login module logs the portable electronic device onto the scanned access points by the Service Create Identifiers of the access points.

4. The portable electronic device of claim 1, wherein the login module logs the portable electronic device onto the scanned access points by login names and passwords.

5. The portable electronic device of claim 1, wherein the portable electronic device is a mobile phone, a personal digital assistant, or a handheld computer.

6. The portable electronic device of claim 1, wherein the transmitter packages comprise the information of the scanned access points and the scanning time of the access points.

7. A method for tracking locations of a portable electronic device communicating with a server through access points, the portable electronic device comprising a storage unit, a display unit and at least one processor, the method comprising:
   creating a database used to restore information of the access points in the memory;
   scanning the access points which can communicate with the portable electronic device;
   searching the information of the scanned access points from the database;
   determining whether the scanned access points are saved in the database;
   logging the portable electronic device onto the access points if the scanned access points are saved in the database; and transmitting transmitter packages to the server to track locations of the portable electronic device and calculating the locations of the portable electronic device.

8. The method of claim 7, further comprising saving information of the scanned access points and scanning time of the access points in the memory.

9. The method of claim 7, wherein the portable electronic device is a mobile phone, a personal digital assistant, or a handheld computer.

10. The method of claim 7, wherein the searching step searches information of Service Create Identifiers, locations of the access points, login names and passwords of the access points.

11. The method of claim 7, wherein the transmitting step transmits the transmitter packages comprising the information of the scanned access points and the scanning time of the access points.

12. The method of claim 11, wherein the information of the scanned access points are the locations of the access points.

13. The method of claim 7, wherein the logging step logs the portable electronic device onto the scanned access points by the Service Create Identifiers of the scanned access points.

14. The method of claim 7, wherein the logging step logs the portable electronic device onto the scanned access points by login names and passwords of the scanned access points.

15. A non-transitory storage medium having stored thereon instructions that, when executed by a processor, causes the processor to perform a method for tracking locations of a portable electronic device communicating with a server through access points, the portable electronic device comprising a storage unit, a display unit and at least one processor, the method comprising:

creating a database used to restore information of the access points in the memory;

scanning the access points which can communicate with the portable electronic device;

searching the information of the scanned access points from the database;

determining whether the scanned access points are saved in the database;

logging the portable electronic device onto the access points if the scanned access points are saved in the database; and transmitting transmitter packages to the server to track locations of the portable electronic device and calculating the locations of the portable electronic device.

16. The non-transitory storage medium of claim 15, wherein the method further comprising saving information of the scanned access points and scanning time of the access points in the memory.

17. The non-transitory storage medium of claim 15, wherein the searching step searches information of Service Create Identifiers, locations of the access points, login names and passwords of the access points.

18. The non-transitory storage medium of claim 15, wherein the transmitting step transmits the transmitter packages comprising the information of the scanned access points and the scanning time of the access points.

19. The non-transitory storage medium of claim 15, wherein the information of the scanned access points are the locations of the access points.

20. The non-transitory storage medium of claim 15, wherein the logging step logs the portable electronic device onto the scanned access points by the Service Create Identifiers of the scanned access points.

* * * * *